US009122865B2

(12) United States Patent  (10) Patent No.: US 9,122,865 B2
Ho et al.  (45) Date of Patent: Sep. 1, 2015

(54) SYSTEM AND METHOD TO ESTABLISH AND USE CREDENTIALS FOR A COMMON LIGHTWEIGHT IDENTITY THROUGH DIGITAL CERTIFICATES

(71) Applicant: AUTHENTICADE LLC, New York, NY (US)

(72) Inventors: Chris Yi-Cheng Ho, Weymouth, MA (US); Samuel Taylor Zelnick, New York, NY (US)

(73) Assignee: AUTHENTICADE LLC, New York, NY (US)

( * ) Notice: Subject to any disclaimer, the term of this patent is extended or adjusted under 35 U.S.C. 154(b) by 90 days.

(21) Appl. No.: 13/764,201

(22) Filed: Feb. 11, 2013

(65) Prior Publication Data

US 2014/0075524 A1   Mar. 13, 2014

Related U.S. Application Data

(60) Provisional application No. 61/699,502, filed on Sep. 11, 2012.

(51) Int. Cl.
*G06F 7/04* (2006.01)
*G06F 21/45* (2013.01)
*G06F 21/42* (2013.01)

(52) U.S. Cl.
CPC ............... *G06F 21/45* (2013.01); *G06F 21/42* (2013.01)

(58) Field of Classification Search
CPC ............................... H04L 63/08; H04L 63/083
USPC ................... 726/5, 6, 10, 8, 9; 713/156, 175
See application file for complete search history.

(56) References Cited

U.S. PATENT DOCUMENTS

| 7,313,700 | B2* | 12/2007 | Delany ......................... 713/176 |
| 7,380,126 | B2* | 5/2008 | Logan et al. .................. 713/176 |
| 7,650,496 | B2* | 1/2010 | Thornton et al. ............. 713/158 |
| 8,402,523 | B2* | 3/2013 | Adams et al. ..................... 726/6 |

(Continued)

FOREIGN PATENT DOCUMENTS

| WO | 2012/108875 A1 | 8/2012 |
| WO | WO 2012108875 A1 * | 8/2012 |

OTHER PUBLICATIONS

International Search Report and Written Opinion dated Mar. 21, 2014 for the corresponding PCT application PCT/US13/58520.

*Primary Examiner* — Ali Abyaneh
(74) *Attorney, Agent, or Firm* — Ladas & Parry LLP (57) ABSTRACT

A system and method for authentication of a user using "lightweight" identities. The system and method provides for establishment of user credentials for a particular electronic mail address by an identity server through the recordation of a mail token and private token after receiving a request for credentials from the user. The identity server sends a private token to the user and sends a verification message to the user containing a specific link to the identity server for verification of the user along with the mail token, and then can verify the user by confirming that a mail token and private token recorded by the identity server match a mail token and a private token received from the user. After the verification process is successful, the identity server issues credentials that consist of a certificate either with or without a private key to the user which serves as an authenticated, unique, lightweight identity that a user can assume to access various services.

20 Claims, 3 Drawing Sheets

(56) References Cited

U.S. PATENT DOCUMENTS

| | | | |
|---|---|---|---|
| 8,601,558 B2* | 12/2013 | Mok et al. | 726/6 |
| 2005/0069137 A1* | 3/2005 | Landrock | 380/278 |
| 2005/0091290 A1* | 4/2005 | Cameron et al. | 707/201 |
| 2007/0233751 A1* | 10/2007 | Sampson | 707/201 |
| 2008/0022379 A1* | 1/2008 | Wray | 726/6 |
| 2008/0072301 A1* | 3/2008 | Chia et al. | 726/8 |
| 2009/0094275 A1* | 4/2009 | Patton et al. | 707/103 R |
| 2010/0100731 A1* | 4/2010 | Mok et al. | 713/157 |
| 2011/0039592 A1* | 2/2011 | Haddad et al. | 455/515 |
| 2012/0017269 A1* | 1/2012 | Cahill | 726/9 |
| 2012/0185542 A1* | 7/2012 | Vyrros et al. | 709/206 |

\* cited by examiner

X509 Certificate

Distinguished Name (DN)
*Modified for Lightweight Identities*

CN=<Identity>
*e.g., beth@nasa.gov*

O=<Security Domain>
*e.g., uspto.gov*

OU=<Security Level>
*e.g., 3*

Other X509 Fields

FIG. 3

SYSTEM AND METHOD TO ESTABLISH AND USE CREDENTIALS FOR A COMMON LIGHTWEIGHT IDENTITY THROUGH DIGITAL CERTIFICATES

RELATED U.S. APPLICATION

This application claims the benefit of U.S. Provisional Patent Application Ser. No. 61/699,502, filed on Sep. 11, 2012, the entire contents of which are incorporated herein by reference.

BACKGROUND OF THE INVENTION

1. Field of the Invention

This invention relates generally to Internet security devices for authentication of online users, and more particularly to a system, method, apparatus, and program for establishing and using credentials for a common lightweight identity through digital certificates.

2. Related Art

There are numerous online services available to Internet visitors. It is important to both online service providers and their users that the identity of the user is authenticated prior to accessing the server of the online service provider.

SUMMARY OF THE INVENTION

The increasing demand for customized user experiences has grown the number of online services available. These services strain the dominant identification and authentication technologies. Commonly used methods and systems for authentication of online users rely on passwords, which impose significant overhead on both the user and the service. Each service needs to maintain its own password authentication database that is subject to attack, while users must be able to remember their passwords to dozens (if not hundreds) of these sites. Users must also enter the password each time they want access. If they forget a password, they have to go through a cumbersome recovery or reset process. Also, many sites require complex passwords that must change periodically. And regardless of the strength of a password, it will always be vulnerable to theft and fraudulent use. A single sign-on solution would greatly simplify the authentication overhead for the user. Unfortunately, the various attempts at creating a single sign-on solution have drawbacks and have failed to gain widespread acceptance. For example, these solutions often require a very complicated, expensive architecture, and they experience many points of failure. Their complexity and cost especially discourages acceptance from smaller services. Furthermore, because these systems are based on passwords, they are still subject to password database theft and social engineering scams such as phishing.

Another known Internet security technology is digital certificates, which are based on public key cryptography that has been around for decades. Digital certificates provide certain assurances of an identity through a digital document. However, digital certificates impose their own unique challenges to widespread acceptance. Digital certificates are usually provided for services which require strong security, and a system is deemed secure or insecure, with few gradations in the middle. In the conventional view, digital certificates must provide high assurance of identity or else they are effectively worthless. Consequently, certification requires a complex and cumbersome verification process. To date, only government or academic organizations make extensive use of digital certificates, and these systems are very specialized.

In accordance with one aspect of the invention, there is provided a method for authentication of users using "lightweight" identities comprising a unique alias that a user can assume to access services on his behalf. The "lightweight" identity is suitable for, e.g., low-risk services in which the user is not at risk of severe personal damage or liability in the event of a security breach, or as a supplemental form of authentication for higher security access. Examples of low-risk services may include, but are not limited to: games, private clubs, news feeds, and message boards.

The method employs public key cryptography and digital certificates to create a process that allows users to establish and maintain lightweight identities. The invention in one aspect defines a user's electronic mail address as his or her lightweight identity. An electronic mail address is a unique identity theoretically accessible by only the appropriate user. A user may have multiple addresses, and each one of them may establish a lightweight identity through the methods of the invention. The credentials that the invention generates comprise the user's electronic mail address combined with a security domain, which allows services to customize access controls. The credentials provide reasonable assurance that a user has ownership of an electronic mail address. These credentials may then be used with participating services as either a sole source of authentication, or possibly as supplemental (multi-factor) authentication. Credentials consist of two parts: the certificate, which contains the verified identity itself, and its matching private key, which proves ownership of the certificate. The present invention issues to the user the certificate, but the private key can come from any other source—for example, a smart card, an existing key used for other purposes, software on the user's machine, even the identity server itself.

The invention also provides a system for authentication of users using "lightweight" identities which utilize a combination of public key cryptography technology and digital certificates. The new class of "lightweight" identities introduced by the invention uses digital certificates on top of mostly pre-existing infrastructure. These identities provide a single sign-on solution that can liberate both users and services from the limitations of password authentication mechanisms.

The present invention also provides a non-transitory, computer-readable medium storing a program, which, when executed by a processor, automatically authenticates users using "lightweight" identities by a combination of public key cryptography technology and digital certificates.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures in which.

The invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

The present invention is particularly directed to an improved method 100 for establishing user credentials for a common lightweight identity. The method 100 (see FIG. 1) involves generation of credentials by an identity server. It is preferable for all transactions of the method 100 to take place over a secure (encrypted) link. With reference to the diagram of FIG. 1, the boxes on the left of the figure represent user-facing activity, while the boxes on the right of the figure represent events on the identity server. Furthermore, the REQUEST procedure in the upper part of FIG. 1 (Request Step) generates verification tokens, and the VERIFICATION/GENERATION procedure in the lower part of FIG. 1 (Verification Step) essentially consumes those tokens and otherwise interacts with certificates, public keys, and private keys, as further described below.

Figure 1:
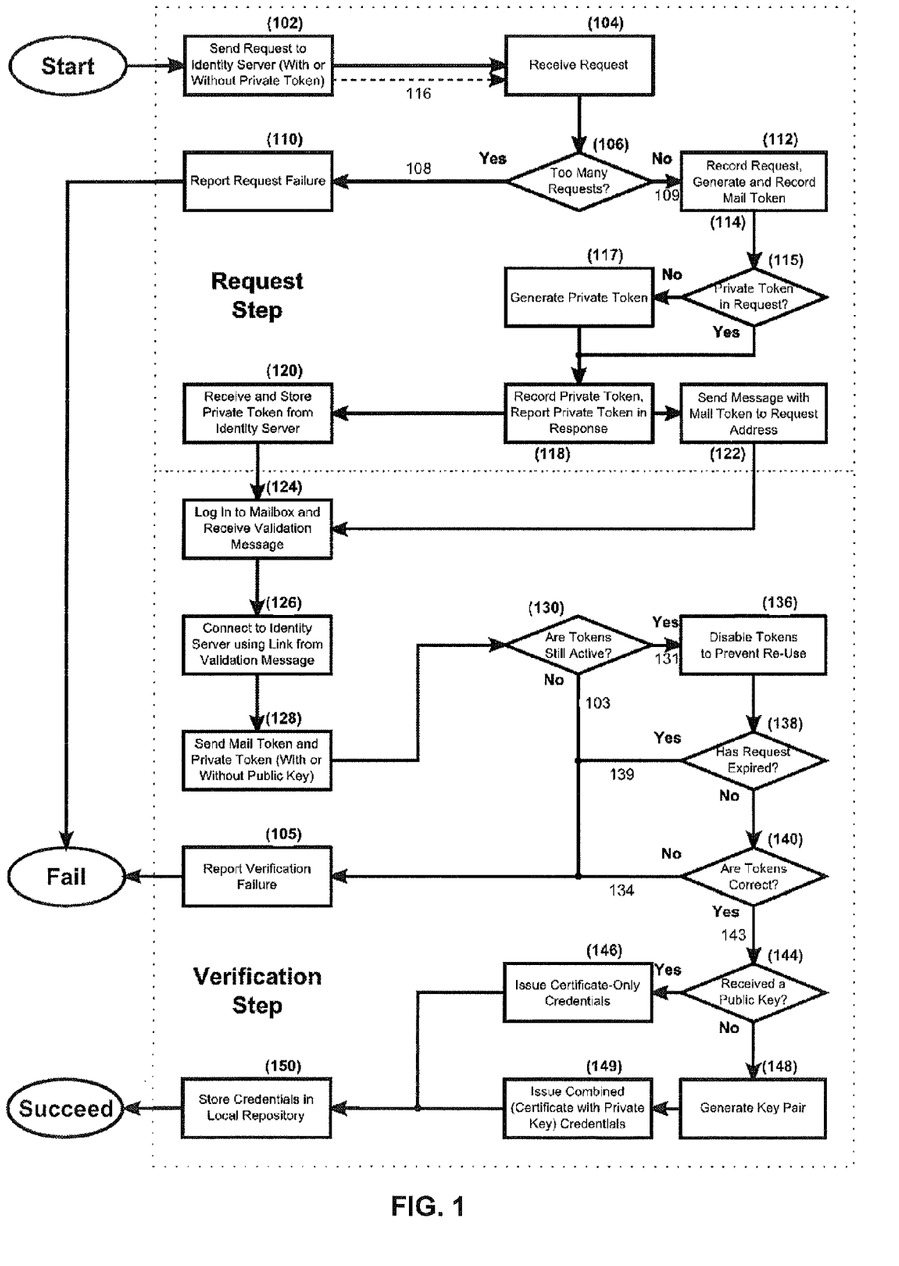
FIG. 1 is a block diagram of the method for establishing user credentials for a common lightweight identity.

Step 102 of the method 100 is the sending by the user via a requesting software application (e.g., a browser) of a request to the identity server for issuance of new credentials for said electronic mail address. The user sends a request to the identity server over, e.g., a public network. For increased security, it is preferable that each electronic mail address may only initiate a maximum number of requests in a predetermined span of time to minimize abuse. In a preferred embodiment, a predetermined maximum number of requests in a specific time period is entered into the identity server.

Step 104 of the method is receiving the request for credentials for an electronic mail address by the identity server. Step 106 is analysis of whether the total number of requests for new credentials from that electronic mail address over a specific time period is greater than a predetermined maximum allowable number of requests. If the number of requests for new credentials exceeds the predetermined maximum number of requests, a fail signal 108 is issued which instructs the identity server to refrain from generating credentials. In preferred embodiments, the identity server directs the user to a failure screen, and may send a failure message to the user via e-mail 110. If in step 106 the number of requests for new credentials does not exceed the predetermined maximum number of requests, a trigger signal is issued 109 which instructs the identity server to record the request 112 and proceed with the process of generating credentials. (Steps 104, 106, 108, 110, and 112 may be performed by, e.g., the Request Module 154 of the system shown in FIG. 2, discussed in more detail below.)

Steps 114-118 describe the generating and/or the recording by the identity server of two unique, single-use digital tokens: a private token and a mail token. For heightened security the tokens are preferably random strings because deterministic values may be easy to reverse engineer and spoof. These tokens are preferably globally unique ID (GUID) numbers. However, in alternative embodiments, the tokens may be any random string of arbitrary length. In preferred embodiments, Steps 114, 115, 117, and 118 may be performed by the Request Module 154.

It is noted that the identity server generates the mail token in step 114, but either the user or the identity server may generate the private token. In embodiments where the user generates the private token, sending 116 of the private token is performed by the requesting software application as part of the request for credentials. In embodiments where the identity server generates the private token instead of the user, the identity server generates the private token in step 117 after checking in step 115 whether a private token was in the request and sends it in step 118. The user then receives and stores the private token 120 from the identity server. Regardless of how the private token is sent to the user, storing of the private token locally must be performed by the user. For instance, the storage of the private token may be accomplished by storage in the user's web browser as a temporary "cookie", which is a small data fragment stored on the browser. The storing 120 of the private token may be performed through fully automated or partially automated storage means or media known in the art.

Step 122 of the method is the sending of an electronic mail verification message to the destination address by the identity server. The message contains verification links to secure areas of the identity server which are adapted to further verify and process the request for credentials. The verification message also includes the mail token generated in Step 114.

Step 124 of the method 100 is retrieving by the user of the verification message and mail token by logging into his electronic mail account. The verification message will provide verification links to a specific webpage on the identity server for verification of the mail token and private token.

Step 126 is connecting to the identity server address at the link provided in the verification message by the user. This may be performed by simply clicking the link provided in the verification message, inputting the address in an Internet browser, or by direct connection through a custom application, etc. When the user connects 126 to the link for verification, the private token and mail token are transmitted 128 to the identity server for verification.

The private token and mail token are then verified 130 by the identity server. The verification step involves analysis by the identity server of whether the tokens are still active. If either the private token or mail token is no longer active, a fail signal 103 is issued which instructs the identity server to refrain from issuing a certificate. In preferred embodiments, a fail message may be sent 105 by the identity server to the user via e-mail and the identity server will also direct the user to an error page.

If the identity server determines in the verification step 130 that the private token and mail token are still active, issuing of a trigger signal 131 is then performed by the identity server. The trigger signal instructs the identity server to disable 136 the tokens to prevent re-use of the tokens and to proceed to the next step of the verification process. Step 138 is analysis of whether the request recorded in 112 has expired or is timely by the identity server. If the request has expired, a fail signal 139 is issued which instructs the identity server to refrain from issuing a certificate. A fail message may be sent 105 by the identity server to the user. If the request has not expired, analysis 140 of whether the mail token and private token transmitted 128 by the user match the mail token and private token recorded by the identity server in steps 114 and 118, respectively, is performed by the identity server. (Of course, the private token recorded in step 118 was either sent by the user with the request 102 as determined in step 115 or, if not sent by the user, then generated by the identity server in step 117.) If the tokens do not match, a fail signal 134 is issued which instructs the identity server to refrain from issuing a certificate. A fail message may be sent 105 by the identity server to the user.

If the tokens transmitted by the user in step 128 match the mail token and private token recorded by the identity server in steps 114 and 118, respectively, and the request has not expired yet, a trigger signal is issued 143 which causes the identity server to direct the user to a credentials retrieval interface (which may be, e.g., the Generator Module 156 of FIG. 2 discussed below). The private token is to ensure that the certificate is going to the user that initiated the request, while the mail token is to ensure that the user has access to the electronic mail address. This process reduces the risk of an attacker acquiring and using an old verification link in the user's mailbox, in that the verification tokens may be used only once, and only for a limited time. It also allows the identity server to streamline the certificate request and verification process by automating or customizing portions of the process based on the capabilities of the original request environment. The various request limits can also prevent malicious users from spamming requests for other users.

In one embodiment, the retrieval interface instructs the identity server to generate credentials that include a certificate and an asymmetric key pair (which consists of a public key and a private key that are cryptographically bound to each other). The certificate contains the verified identity wrapped around the public key while the private key serves as proof of ownership of the certificate. In alternative embodiments, the user provides a public key to the retrieval interface, which will instruct the identity server to return a certificate wrapped around the public key. In this scenario, the public key supplied by the user may come from any source—for example, an existing key pair used for other purposes, a smart card, software on the user's machine, etc.

Specifically, referring again to the flowchart of FIG. 1, in step 144 the identity server checks whether it has received a public key from the user. If so, in step 146 the identity server will issue certificate-only credentials, i.e., a certificate wrapped around the public key, with no private key. If not, then in step 148 the identity server will generate a key pair, and in step 149 the identity server will issue combined credentials, i.e., a private key with a certificate wrapped around its corresponding public key.

The credentials serve as an authenticated lightweight Internet identity which has been linked to the user's electronic mail address. The credentials preferably have a relatively short lifespan and are typically valid for no longer than a particular time period, e.g., several weeks, a few months, a year, etc.

Step 150 is the installation by the user of the credentials into a locally accessible credential repository so that other applications have access to them. The user chooses the desired credentials repository, and the repository may require its own authentication procedure to grant access to a protected storage area. The user may install the same credentials in multiple repositories if desired.

Such locally accessible credential repositories are known in the art. Example operating systems containing built-in secured key storage capabilities include, e.g., Windows Certificate Store, Apple KeyChain, Mozilla NSS, etc. The user can also store it in a secured local file such as a PKCS12 container or a Java KeyStore, or the credentials can be stored on a Smart Card under a PKCS15 structure or some other proprietary structure. The repository may be in a special operating-system controlled memory area, a local hard drive, a removable drive, a smart card, or even an online storage facility. The actual containers and formats vary. In any event, a preferred implementation of the present invention automatically attempts to select and use a local repository where possible, but the user always has the option to put the credentials somewhere else.

Services may then recognize the credentials for authentication purposes by means known in the art. For instance, services may configure their servers to load and recognize the identity server's Certificate Authority (CA) certificate, and the service will then verify the user credentials against the identity server's Certificate Authority (CA) certificate using standard verification checks through automated means when the user tries to use the service. The automated means may be Secure Socket Layer (SSL) or Transport Layer Security (TLS) authentication which have been standardized in various communication protocols. Since authentication is automatic using existing infrastructure, services do not need to directly implement any verification functionality. However, manual verification is possible using standard X.509 certificate verification procedures. If the certificate passes verification, then the user can access the services using the identity stored in the certificate.

Services may still want independent authentication means to be provided for allowing further verification of the certificate. In a preferred embodiment, the identity server is adapted to allow networked services to query the state of any certificate using only a certificate's serial number and electronic mail address. The identity server will respond negatively if the corresponding certificate is no longer valid.

Figure 2:
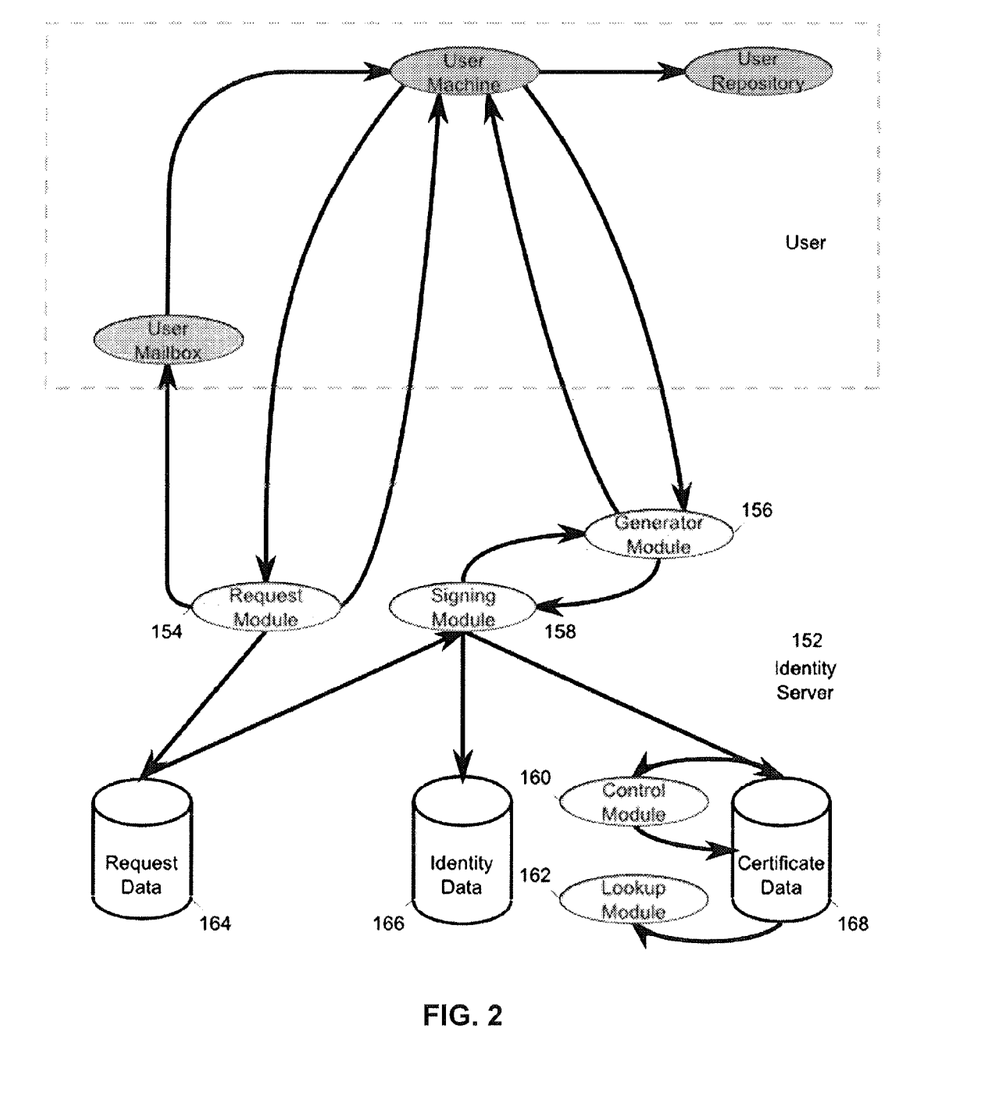
FIG. 2 shows a block diagram for a system for establishing user credentials for a common lightweight identity.

The invention also provides a system as shown in FIG. 2 which can use the generation/verification method of FIG. 1. The system comprises an identity server 152 having a Request Module 154, a Generator Module 156, a Signature Module 158, a Control Module 160, and a Lookup Module 162. The modules access different pools of data including Request Data database 164, Identity Data database 166, and Certificate Data 168 database, which may or may not be located within the identity server 152. The user machine shown in FIG. 2 accesses a user credentials repository and a user mailbox.

The Request Module 154 is adapted to accept and record a request for a set of credentials sent by the user (see, e.g., steps 104 and 112 of the method shown in FIG. 1). The Request Module 154 also is adapted to analyze and determine whether the total number of requests for new credentials from the user's electronic mail address over a specific period of time is greater than a predetermined maximum number of requests (e.g., step 106). If the number of requests for new credentials exceeds the predetermined maximum number of requests, the identity server 152 is adapted to refrain from generating credentials (e.g., step 108). In certain embodiments, the identity server 152 may be adapted to also issue a fail message to the user via e-mail (e.g., step 110).

The Request Module 154 is also adapted to generate and/or record two unique, single-use digital tokens: a private token and a mail token (e.g., steps 114-118). The tokens are preferably random strings such as globally unique ID (GUID) numbers but may be any random string of arbitrary length. In alternative embodiments, the private token is generated by the user and is sent by the user in the request for credentials. In these embodiments, the Request Module 154 indicates receipt of a private token from the user and refrains from generating a private token (e.g., the YES outcome of step 115). The Request Module 154 is adapted to transmit information concerning pending requests and associated private tokens and mail tokens to the Request Data 164 database where the information is stored. The Request Module 154 is adapted to send an electronic verification message to the user (e.g., step 122). The verification message generated by the Request Module 154 is configured to include verification links to a secure area of the identity server where verification of a request for credentials is performed. The verification message also includes the mail token.

In embodiments where the Request Module 154 generates the private token, the Request Module 154 also is adapted to send the private token to the user (e.g., step 118). The private token is typically sent by the Request Module 154 as a response to the request prior to the sending of the verification message. However, in certain embodiments the mail token and private token may both be sent by the Request Module in the verification message. The private token is stored locally by the user (e.g., step 120), such as by storage in the user's web browser as a temporary "cookie" or by other means known in the art.

The verification message includes instructions for the user to go to a specific Internet address where the user will transmit the mail token and private token to the identity server 152 and the user's request for credentials will be verified (e.g., step 128). The Generator Module 156 is adapted to receive the user's verification request and tokens. The Generator Module 156 is adapted to present a credentials retrieval interface that lets the user either supply his own public key or lets the Generator Module 156 supply the public key (by generating a key pair for the user). The Generator Module 156 is adapted to forward the private token and mail token from the verification process to the Signature Module 158.

In a preferred embodiment, the Generator Module 156 is adapted to create a new asymmetric cryptographic key pair comprising a public key and a private key. In this embodiment, the identity server 152 is configured to generate credentials in the form of a certificate and a private key. The certificate contains the verified identity itself while the private key serves as proof of ownership of the certificate. The public key is associated with the certificate and the certificate is generated by signing of the public key using the identity server's Certificate Authority (CA) private key. The Generator Module 156 is adapted to send the public key along with the private token and mail token to the Signature Module 158. The Generator Module 156 is adapted to retain the private key until the Signature Module 158 responds with the signed credentials.

The Signature Module 158 is adapted to determine whether the private token and mail token are still active (e.g., step 130), whether the request has expired (e.g., step 138), and whether the mail token and private token transmitted 128 by the user match the mail token and private token recorded (114 and 118, respectively) in the Request Data 164 database (e.g., step 140). The Signature Module 158 is adapted to deny the request for credentials if the verification analysis indicates that the tokens are inactive (e.g., step 103), the request has expired (e.g., step 139), or the mail token and private token do not match the tokens recorded in the Request Data database 164 (e.g., step 134).

The Signature Module 158 is also adapted to disable the tokens to prevent re-use of the tokens once the tokens have been verified as being active (e.g., step 136). If verification is successful, the Signature Module 158 is adapted to generate a certificate. In a preferred embodiment the Signature Module generates a modified X509 certificate by signing the public key using the identity server's Certificate Authority (CA) private key. The resulting X509 certificate does not follow the standard interpretation of typical Distinguished Name (DN) fields such as Country (C, OID 2.5.4.6), Organization (O, OID 2.5.4.11), Organizational Unit (OU, OID 2.5.4.10), and Common Name (CN, OID 2.5.4.3). Instead, the user's E-Mail address is stored in the Common Name (CN) field, while the other fields have been repurposed to describe the signing context such as the allowed domain(s) (in the Organization (O) field) and security level (in the Organizational Unit (OU) field) assigned by the identity server for the credentials. Additional signing context data depends on the domain(s) (allowed services) and security level that the identity server assigns to the credentials. The Signature Module 158 records the certificate in the Certificate Data database 168, which is a data pool adapted to maintain a list of all currently-valid certificates.

The Signature Module is adapted to return the signed certificate to the Generator Module 156. The Generator Module 156 is adapted to assemble and transmit the credentials to the user. In embodiments where the Generator Module generates the asymmetric key pair, the credentials are preferably issued in the form of a private key and certificate. In these embodiments, it is preferable that the Generator Module 156 generates the asymmetric key pair upon receipt of the verification request and packages the keys along with the certificate when sending the credentials to the user. In alternative embodiments, the credentials are issued solely in the form of a certificate without an associated private key.

The credentials are adapted to be stored by the user and to be used by service providers for authentication as previously described.

The system also includes a Control Module 160 which allows the user to manage the state of certificates recognized by the identity server 152. For instance, the user may invalidate credentials with the Control Module 160.

The system also optionally includes a Lookup Module 162 which is an authentication component that is adapted to allow Internet services to further verify the validity of a certificate. The Lookup Module 162 has means to allow Internet services to verify that a certificate belongs to a user. The Lookup Module 162 is also adapted to issue fail messages if the credentials are not valid. The module, which is an optional component, adds an increase in security and assurance for the Internet services and the users.

The system is adapted to maintain the Identity Data database 166 which is a permanent record of identities issued by a particular security domain. The Certificate 168 and Identity 166 Data sources are preferably separated from each other for heightened security. Information concerning identities stored in the identity data 166 are permanent records, while information concerning certificates in the Certificates Data 168 is not permanent as certificates may be invalidated as needed. Certificates are also publicly visible, and are preferably widely mirrored to scale with a high volume of lookups.

Another aspect of the invention is a non-transitory computer-readable medium storing a program which, when executed by at least one processor, provides authentication for users of an Internet services in accordance with the previously described method.

The present invention as described above distinguishes over conventional methods/systems and provides a number of advantages. Although the present invention is based on traditional digital certificate issuance and verification, it uses cryptography to increase convenience rather than enhance security. The present invention diverges from high-security industry standards with a few changes that greatly improve usability and accessibility:

- The credentials of the present invention only identify an electronic mail address, not a person.
- Instead of breaking down the certification process into several steps to maximize security, accountability, and customization, the two-token verification process of the present invention enables the present invention to combine all the steps necessary for verification and certification into a single transaction.
- Instead of allowing users to customize their identity using a traditional Certificate Signing Request (CSR), the process of the present invention dictates a user's identity. As a result, the method of the present invention skips the traditional CSR process, and signs public keys directly.

Instead of providing assurance for only a few high-security credentials, the user is encouraged to generate as many credentials as convenient. In fact, the process takes advantage of frequent turnover of credentials to enhance security.

Traditional certificates have information that constrains how a certificate must be used. The certificates of the present invention add a security domain that suggests where a certificate should be used. Security domains give services more control over the authentication process because they are optional and secondary to the main identity.

Figure 3:
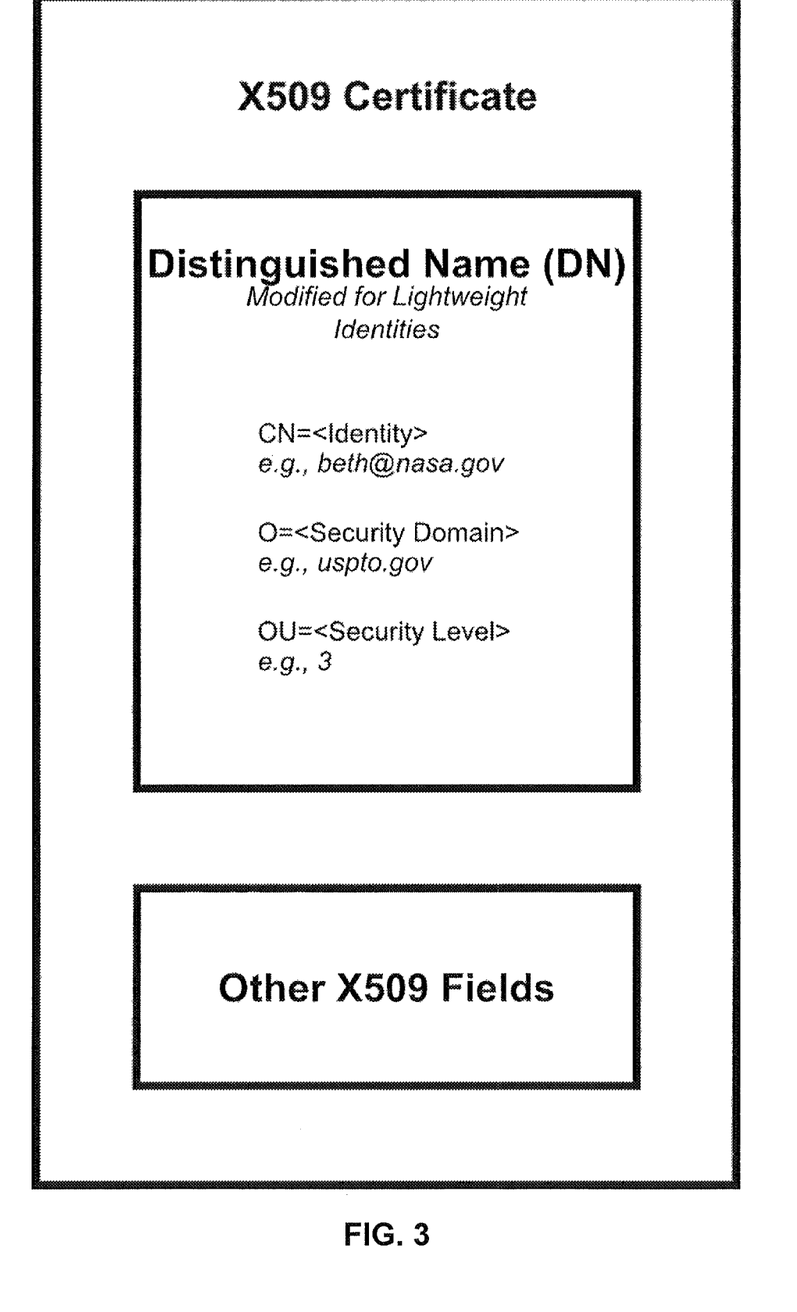
FIG. 3 shows an interpretation of a certificate.

A certificate's Distinguished Name (DN) field traditionally describes just the user, but the credentials generated by the present invention use the DN field to describe the user along with the security domain of the credentials (see FIG. 3). The process of the present invention stores the security domain in the DN field because the DN field is much easier for services to access than other parts of a certificate.

The online query interface of the present invention gives services additional control over the authentication process without relying on traditional certificate status checks using certificate revocation lists (CRLs) or the online certificate status protocol (OCSP). The traditional mechanisms work automatically at a lower networking level, and follow a very strict process that developers can't control. They are also not guaranteed to be available. Under the system of the present invention, users may invalidate their certificates online by using the control module, and the online query tool checks the current certificate state. The online query tool is much more flexible because it gives control of certificate status checks to service developers who wish to evaluate the credentials on a higher level even after the automatic authentication completes The process of the present invention can also provide the following advantages over existing identity establishment approaches:

There is no need to maintain a password database on the server end, thus reducing both the user's and the service's exposure in the event of a security breach.

There is no need to implement a complicated authentication system that includes a login screen, password retrieval system, password restrictions, secret answers, identification images, or any other technique currently considered best-practice.

A simple and automated identity establishment can be provided, without the need for manual verification, and users can generate as many credentials as necessary.

There is resistance to fraudulent activity due to the lack of passwords because certificate-based authentication requires a private key that the user never shares.

There is no need to install additional software because the process of the present invention relies on existing technologies and infrastructure.

A simpler, more efficient, and more reliable authentication can occur that transparently takes place at a lower level, unlike the complex exchanges with an external authority required by traditional single sign-on solutions such as OpenID and password storage databases The process of the present invention supports multiple security domains by providing additional certificate information in the DN field. Services that require specialized credentials may consider the extra information during authentication instead of relying on custom identity servers.

A lightweight identity is effective as a universal form of identification for many different uses, whether online or offline. Online messaging services may use lightweight identities to assure the identity of the sender. They may even be used to easily and positively identify the sender and receiver of electronic payments. However, lightweight identities do not require access to the identity server or even a network connection because authentication only requires the presence of the user's credentials and the identity server's CA certificate. Consequently, lightweight identities are useful outside of online services. They may identify users to each other, especially in the growing field of Near Field Communications (NFC), a set of protocols for close proximity communication. They also have the ability to enforce Digital Rights Management (DRM) and other local access control. In fact, standalone devices may even require the presence of a smart card token holding valid credentials before operating.

The present invention or any part(s) or function(s) thereof, including, e.g., the identity server 152, the Request Module 154, the Generator Module 156, the Signature Module 158, the Control Module 160, the Lookup Module 162, the Request Data database 164, the Identity Data database 166, and the Certificate Data database 168 may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interface which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for establishing user credentials of a service on a computer network by an identity server, comprising the steps of:
   receiving from a requesting software application a request for new credentials for an electronic mail address;
   generating a single use mail token, wherein the mail token is to ensure that the user has access to the electronic mail address;
   recording the mail token and a single use private token, wherein the private token is to ensure that the credentials are issued to the requesting software application;
   sending the private token to the requesting software application;
   sending a verification message to said electronic mail address including a verification link for credentials and the mail token generated in said generating step;
   receiving a request for verification of said electronic mail address through said verification link, wherein the request for verification includes both a mail token and a private token transmitted by the requesting software application;
   verifying the request for verification including verifying that the mail token and the private token received from said requesting software application are still active and match the mail token and the private token recorded in said recording step;
   responsive to determining that the private token and the mail token are no longer active or that the mail token and the private token do not match the mail token and the private token recorded in said recording step, refraining from issuing the credentials;
   responsive to determining the private token and the mail token are still active and match the mail token and the private token received from said electronic mail address, issuing and sending the new credentials to the requesting software application,
   wherein said method further comprises the step of disabling the private token and the mail token after determining that the private token and the mail token are still active, to prevent re-use of the private token and the mail token.

2. The method of claim 1, further comprising after said generating step:
   checking whether a single use private token was received with the request for the issuance of new credentials; and
   responsive to determining a single use private token was not received with the request, generating by the identity server a single use private token,
   wherein the private token recorded in said recording step is one the single use private token received with the request or the single use private token generated by the identity server.

3. The method of claim 1, further comprising the step of analyzing whether a total number of requests from said electronic mail address exceeds a predetermined maximum number of requests;
   responsive to determining the total number of requests from said electronic mail address exceeds the predetermined maximum number of requests, refusing the request without recording the private token and mail token, and
   responsive to determining the total number of requests from said electronic mail address is less than the predetermined maximum number of requests, proceeding to the next step for establishing user credentials.

4. The method of claim 1, wherein said verifying step further includes confirming that the request for the issuance of new credentials has not expired.

5. The method of claim 4, wherein:
   responsive to determining that the private token and the mail token are still active, the request has not expired, and the mail token and the private token received from said electronic mail address match the mail token and the private token recorded in said recording step, issuing the new credentials; and
   responsive to determining that the mail token and the private token are not still active, or that the request has expired, or that the mail token and the private token do not match the mail token and the private token recorded in said recording step, refraining from issuing the new credentials.

6. The method of claim 1, further comprising, after said verifying step:
   checking whether a public key has been received from the requesting software application;
   responsive to determining a public key has been received, issuing certificate-only credentials comprising just a certificate wrapped around the public key; and
   responsive to determining a public key has not been received, generating an asymmetric key pair including a public key and a private key that are cryptographically bound to each other, and issuing combined credentials comprising a private key and a certificate wrapped around the corresponding public key.

7. The method of claim 1, further comprising the step of enhancing authentication, including:
   checking whether the supplied credentials were verified by the underlying network protocol; and
   checking whether the credentials are still valid by querying the Lookup Module.

8. A system for establishing user credentials of a service on a computer network, comprising:
   a memory,
   a Request Module and a Signature Module, wherein:
   the Request Module is adapted to receive and record a request for new credentials for an electronic mail address from a requesting software application;
   the Request Module is adapted to generate and record a single use mail token, wherein the mail token is to ensure that a user has access to the electronic mail address;
   the Request Module is adapted to:
     check whether a single use private token was received with the request for the issuance of new credentials, wherein the private token is to ensure that the credentials are issued to the requesting software application,
     responsive to determining a private token was not received with the request, generate a single use private token, and
     record the private token when it is determined that the private token is received with the request or record the private token generated by the Request Module, and send the recorded private token to the requesting software application;

the Request Module is adapted to send an electronic verification message to said electronic mail address which includes the mail token and an address for the requesting software application to verify the request for the new credentials;

a Generator Module is adapted to receive a verification request from said requesting software application which includes both a single use mail token and a single use private token;

the Generator Module is adapted to transmit the mail token and the private token received from said requesting software application to the Signature Module;

the Signature Module is adapted to verify the mail token and the private token received by the Generator Module and to further verify the request for the new credentials;

the Signature Module is adapted to disable the private token and the mail token after determining that the private token and the mail token are still active to prevent re-use of the private token and the mail token;

wherein the Signature Module is adapted to successfully verify the request for the issuance of a new certificate when the verifying confirms that the mail token and the private token are still active, the request has not expired, and the mail token and the private token match the mail token and the private token recorded by the Request Module; and wherein the Signature Module is adapted to deny the request for the issuance of a new certificate when the verifying determines that the mail token or the private token is no longer active, the request has expired, or the mail token and the private token do not match the mail token and the private token recorded by the Request Module;

the Signature Module is adapted to generate a new certificate for said electronic mail address and transmit said certificate to the Generator Module; and the Generator Module is adapted to assemble the new credentials using the new certificate and send the new credentials to said requesting software application, wherein the Request Module, the Signature Module, and the Generator Module are stored in the memory.

9. The system of claim 8, wherein the Generator Module is adapted to:

receive the new certificate generated by the Signature Module, and responsive to determining a public key has been received from the requesting software application, assemble certificate-only credentials comprising just a certificate; and responsive to determining a public key has not been received from the requesting software application, generate an asymmetric key pair including a public key and a private key that are cryptographically bound to each other and assemble combined credentials comprising a certificate and the generated private key.

10. The system of claim 9, wherein:

the Generator Module is adapted to generate the private key and the public key after receiving the verification request from said electronic mail address and to transmit the public key to the Signature Module;

the Generator Module is adapted to maintain the private key while the request is verified by the Signature Module; and the Generator Module is adapted to package the private key into the new credentials after receiving the new certificate from the Signature Module.

11. The system of claim 9, wherein:

the Generator Module presents a credentials retrieval interface adapted to receive a public key from said requesting software application and instruct the Signature Module to return a certificate in connection with the public key to the Generator Module if the request for credentials is verified.

12. The system of claim 8, further comprising:

a Control Module which is adapted to permit the user to manage the credentials recognized by the system; and a Lookup Module which is adapted to allow services to verify the validity of the credentials.

13. The system of claim 8, wherein:

the Request Module is adapted to transmit information relating to pending requests for credentials and the associated private token and mail token to a Request Data database;

the Request Data database is adapted to store information received from the Request Module;

an Identity Data database is adapted to maintain a permanent record of information concerning the identities of users of the system; and a Certificate Data database is adapted to maintain a record of certificates the system has issued.

14. The system of claim 8, wherein the Request Module is adapted to:

analyze whether a total number of requests from said electronic mail address exceeds a predetermined maximum number of requests; and deny the request for credentials if the total number of requests for credentials from said electronic mail address exceeds the predetermined maximum number of requests.

15. A non-transitory computer-readable medium storing a program which, when executed by at least one processor, causes at least one processor to perform a method for establishing user credentials of a service on a computer network by an identity server, said method comprising the steps of:

receiving from a requesting software application a request for new credentials for an electronic mail address;

generating a single use mail token, wherein the mail token is to ensure that the user has access to the electronic mail address;

recording the mail token and a single use private token, wherein the private token is to ensure that the credentials are issued to the requesting software application;

sending the private token to the requesting software application;

sending a verification message to said electronic mail address including a verification link for credentials and the mail token generated in said generating step;

receiving a request for verification of said electronic mail address through said verification link, wherein the request for verification includes both a mail token and a private token transmitted by the requesting software application;

verifying the request for verification including verifying that the mail token and the private token received from said requesting software application are still active and match the mail token and the private token recorded in said recording step;

responsive to determining that the private token and the mail token are no longer active or that the mail token and the private token do not match the mail token and the private token recorded in said recording step, refraining from issuing the credentials;

responsive to determining the private token and the mail token are still active and match the mail token and the private token received from said electronic mail address, issuing and sending the new credentials to the requesting software application, wherein said method further comprises the step of disabling the private token and the mail token after determining that the private token and the mail token are still active, to prevent re-use of the private token and the mail token.

16. The non-transitory computer-readable medium of claim 15, wherein said method further comprises, after said generating step:

checking whether a private token was received with the request for the issuance of new credentials; and responsive to determining a private token was not received with the request, generating by the identity server a private token, wherein the private token recorded in said recording step is the private token received with the request or the private token generated by the identity server.

17. The non-transitory computer-readable medium of claim 15, wherein the method further comprises the step of analyzing whether a total number of requests from said electronic mail address exceeds a predetermined maximum number of requests; and:

responsive to determining the total number of requests from said electronic mail address exceeds the predetermined maximum number of requests, refusing the request without recording the private token and mail token, and responsive to determining the total number of requests from said electronic mail address is less than the predetermined maximum number of requests, proceeding to the next step for establishing user credentials.

18. The non-transitory computer-readable medium of claim 17, wherein:

responsive to determining that the private token and the mail token are still active, the request has not expired, and the mail token and the private token received from said electronic mail address match the mail token and the private token recorded in said recording step, issuing the new credentials; and responsive to determining that the mail token and the private token are not still active, or that the request has expired, or that the mail token and the private token do not match the mail token and the private token recorded in said recording step, refraining from issuing the new credentials.

19. The non-transitory computer-readable medium of claim 15, wherein said verifying step further includes confirming that the request for the issuance of new credentials has not expired.

20. The non-transitory computer-readable medium of claim 15, wherein said method further comprises, after said verifying step:

checking whether a public key has been received from the requesting software application;

responsive to determining that a public key has been received, issuing certificate-only credentials comprising just a certificate; and responsive to determining that a public key has not been received, generating an asymmetric key pair including a public key and a private key that are cryptographically bound to each other and issuing combined credentials comprising a certificate and the generated private key.

* * * * *